(12) United States Patent
Saitoh

(10) Patent No.: US 9,440,637 B2
(45) Date of Patent: Sep. 13, 2016

(54) TRANSMISSION APPARATUS

(71) Applicant: Yamaha Hatsudoki Kabushiki Kaisha, Shizuoka-ken (JP)

(72) Inventor: Tetsushi Saitoh, Shinzuoka (JP)

(73) Assignee: YAMAHA HATSUDOKI KABUSHIKI KAISHA, Shizuoka-Ken (JP)

(*) Notice: Subject to any disclaimer, the term of this patent is extended or adjusted under 35 U.S.C. 154(b) by 137 days.

(21) Appl. No.: 14/457,657

(22) Filed: Aug. 12, 2014

(65) Prior Publication Data

US 2015/0051802 A1 Feb. 19, 2015

(30) Foreign Application Priority Data

Aug. 13, 2013 (JP) ................. 2013-168293

(51) Int. Cl.
| | |
|---|---|
| *B60W 10/04* | (2006.01) |
| *B60W 10/11* | (2012.01) |
| *F16H 61/16* | (2006.01) |
| *F16H 59/44* | (2006.01) |
| *F16H 59/46* | (2006.01) |
| *F16H 61/688* | (2006.01) |
| *F16H 61/00* | (2006.01) |

(52) U.S. Cl.
CPC .............. *B60W 10/11* (2013.01); *B60W 10/04* (2013.01); *F16H 59/44* (2013.01); *F16H 59/46* (2013.01); *F16H 61/16* (2013.01); *B60Y 2200/12* (2013.01); *F16H 61/688* (2013.01); *F16H 2061/0068* (2013.01); *F16H 2061/163* (2013.01); *F16H 2342/00* (2013.01)

(58) Field of Classification Search
None
See application file for complete search history.

(56) References Cited

U.S. PATENT DOCUMENTS

| | | | |
|---|---|---|---|
| 2007/0186705 A1 | 8/2007 | Suzuki | |
| 2009/0227419 A1* | 9/2009 | Martin | B60W 10/02 477/84 |
| 2010/0131164 A1* | 5/2010 | Carter | B60L 11/1805 701/61 |
| 2011/0040461 A1* | 2/2011 | Wolterman | B60W 10/02 701/51 |
| 2013/0245900 A1 | 9/2013 | Fukushima et al. | |

FOREIGN PATENT DOCUMENTS

| | | |
|---|---|---|
| EP | 1091151 A1 | 4/2001 |
| EP | 2031281 A2 | 3/2009 |
| JP | H05-187967 A | 7/1993 |
| JP | H07-35654 A | 2/1995 |
| JP | 2001-099293 A | 4/2001 |
| JP | 2008-169972 A | 7/2008 |
| WO | WO-2012/067234 A1 | 5/2012 |
| WO | WO 2012-067234 A1 | 5/2012 |

OTHER PUBLICATIONS

Extended European Search Report dated Dec. 15, 2014.

* cited by examiner

*Primary Examiner* — Justin Holmes
(74) *Attorney, Agent, or Firm* — Rabin & Berdo, P.C.

(57) ABSTRACT

A transmission apparatus mounted on a vehicle has a front-wheel speed sensor for sensing a rotation speed of a front wheel. A control unit has a ratio-change correction part that determines a correction in transmission control of the transmission apparatus using the rotation speed of the front wheel sensed by a front-wheel speed sensor. The control unit limits execution of the correction under a condition that an external device is connected to a connector. Thereby, the execution of the correction based on the rotation speed of the front wheel without a worker's intention during driving on a chassis dynamo may be suppressed.

22 Claims, 7 Drawing Sheets

TRANSMISSION APPARATUS

CROSS-REFERENCE TO RELATED APPLICATION

The present application claims priority from Japanese application JP 2013-168293 filed on Aug. 13, 2013, the content of which is hereby incorporated by reference into this application.

BACKGROUND OF THE INVENTION

1. Field of the Invention

Some embodiments described herein relate to a transmission apparatus mounted on a vehicle and a method for controlling a transmission apparatus.

2. Description of the Related Art

In related art, various transmission systems have been employed for transmission apparatuses in drive systems of vehicles. One of them is a manual transmission (hereinafter, referred to as "MT") system for a driver to change the transmission gear using a clutch lever and a change pedal (shift pedal).

Or, an automatic transmission (AT) system of changing transmission gear by automatically driving a shift actuator in response to a vehicle speed, an engine speed, or the like may be used.

As to the AT system, torque converter AT for automatic transmission by combining a torque converter and a planetary gear under hydraulic control is mounted in the largest number of vehicles. In the torque converter AT, times of ratio-change are finely set based on various elements including the degree of pressing the accelerator and the vehicle speed under computer control.

Further, the AT system includes an automated manual transmission (hereinafter, referred to as "AMT") system of automating only the clutch operation and combining a manually-selected multistage transmission having the same structure as the MT system in the clutch and the gearbox themselves.

The AMT system is also called a semi-automatic transmission system, and only the clutch operation is automatic and the driver performs selection of the throttle and the transmission gears by the operation of the MT system as it is. That is, the shift actuator is driven according to a drivers command and the transmission gear is changed.

Currently, the AMT mounted on a passenger vehicle controls the throttle opening and the actuators of the clutch and the gearbox by fly-by-wire (electronic control) and automatically selects the gear. Further, as a transmission apparatus mounted on an automobile, a dual clutch automated manual transmission (DCT) as an AMT system having two power transmission paths is known.

Furthermore, there is a continuously variable transmission (hereinafter, referred to as "CVT") system that can steplessly change the transmission ratio in a transmission apparatus from low to top, not changing the gear.

In the CVT, the ratio between the speed of the driving side and the speed of the driven side in the transmission apparatus, i.e., the transmission ratio can be continuously and steplessly changed, and the driver performs only the accelerator operation and the transmission ratio is automatically set according to the driving situations defined by the manipulated amount of the accelerator, the vehicle speed, and drive load.

In the AT system, the AMT system, or the DCT system, the CVT system, generally, compared to the MT system, the clutch operation and the shift operation of setting the transmission ratio are automated, the clutch operation and the shift operation of the driver are eliminated, and thereby, the driving operation is simplified.

Further, in the transmission apparatuses of the AT system, or the AMT system, the DCT system, the CVT system, when the vehicle is turning, delay of ratio-change and restriction of ratio-change are demanded. That is, suppression of unintentional ratio-change by the driver is demanded during turning. Particularly, in a motorcycle, it is necessary to adjust to increase or decrease the output drive force in the rear wheel when turning. Specifically, when the motorcycle turns, the bank angle of the vehicle may be adjusted by the adjustment of increasing or decreasing the drive force, and a preferable turn using the operation is obtained. In this regard, the driver increases or decreases the accelerator to adjust the drive force, and thereby, adjusts the bank angle of the vehicle. While a motorcycle is specifically described herein, the same operations and forces may apply to other two-wheeled vehicles.

When the motorcycle is turning, the transmission ratio of the transmission apparatus may be changed without a drivers intention. Therefore, the output drive force changes regardless of the driver's intention so that controlling the bank angle of the vehicle becomes difficult.

In related art, vehicles may perform a correction based on the rotation speed of the front wheel in the control of a transmission apparatus including a transmission. For example, in International Publication WO2012/067234, whether or not the vehicle is turning is determined using the difference between the vehicle speed calculated from the rotation speed of the front wheel and the vehicle speed calculated from the rotation speed of the rear wheel. If the vehicle is turning, a correction is executed in the in transmission control to delay a ratio-change time and restrict a ratio-change.

SUMMARY OF THE INVENTION

The vehicle may be given a trial run on a chassis dynamo for testing of the transmission apparatus and calibration of a sensor provided to the transmission apparatus (e.g., a sensor for sensing the transmission ratio). On the chassis dynamo, only the rear wheel rotates while the front wheel halts. When the vehicle of International Publication WO2012/067234 is driven on the chassis dynamo, the vehicle is determined as being turned because there is a difference between the vehicle speed calculated from the rotation speed of the front wheel and the vehicle speed calculated from the rotation speed of the rear wheel. As a result, correction in transmission control is executed against a worker's intention and thus a problem in lower workability of calibration and testing arises.

As a method of solving the problem, a method of determining that the vehicle is in a trial run when the front wheel halts and the rear wheel rotates, and restricting correction of delaying the ratio-change time or the like is conceivable. However, the motorcycle may travel only on the rear wheel with the front wheel floated (wheelie run). In the wheelie run, the rotation speed of the front wheel is close to zero, and thereby, it is difficult to distinguish between the wheelie run and the trial run by the above described method of determining the trial run when the front wheel halts and the rear wheel rotates.

Therefore, in some embodiments, a transmission apparatus of a vehicle is provided that may suppress execution of correction based on a rotation speed of a front wheel without a worker's intention to thereby smoothly perform a trial run or sensor calibration in a trial run in which only a rear wheel rotates while the front wheel halts like a trial run on a chassis dynamo.

Accordingly, in some embodiments, a transmission apparatus is provided that includes an actuator that changes a transmission ratio of a transmission; a control unit that sets the transmission ratio of the transmission by driving the actuator; a transmission ratio sensor that detects and outputs the transmission ratio of the transmission to the control unit; and a front-wheel speed sensor that detects and outputs a rotation speed of a front wheel to the control unit. The control unit includes a ratio-change correction part that executes correction in the control of the transmission ratio using the rotation speed of the front wheel detected by the front-wheel speed sensor; and a connector for connecting to an external device to enable communication therewith. The control unit limits the correction of the ratio-change correction part under a condition that the external device is connected to the connector. Note that "change of transmission ratio" by the actuator includes "shifting of gear position" by the actuator and "shifting of sheave" by the actuator in the continuously variable transmission in the meaning thereof.

According in some embodiments, when the vehicle is driven on the chassis dynamo, for example, the external device is connected to the connector, and thereby, correction in transmission control without the worker's intention is suppressed. Note that the correction by the ratio-change correction part of the control unit includes stopping of change of the transmission ratio in meaning thereof.

Further, in one preferred embodiment, the control unit may limit the correction by the ratio-change correction part under a condition that the control unit receives a predetermined signal from the external device. Thereby, correction without the worker's intention is suppressed more reliably.

In addition, in another preferred embodiment, the control unit may execute calibration processing of limiting the correction by the ratio-change correction part and acquiring a sensor value output by the transmission ratio sensor under the condition that the external device is connected to the connector. In this manner, calibration may be efficiently performed. The control unit may send the result of the calibration processing to the external device through the connector.

Furthermore, in another preferred embodiment, the ratio-change correction part may correct at least one of the transmission ratio and a ratio-change time based on the rotation speed of the front wheel as a non-driven wheel and a rotation speed of a rear wheel as a drive wheel. According to the configuration, when the external device is connected to the connector, correction of the transmission ratio or the ratio-change time without the worker's intention may be suppressed.

DETAILED DESCRIPTION OF THE PREFERRED EMBODIMENT

Figure 1:
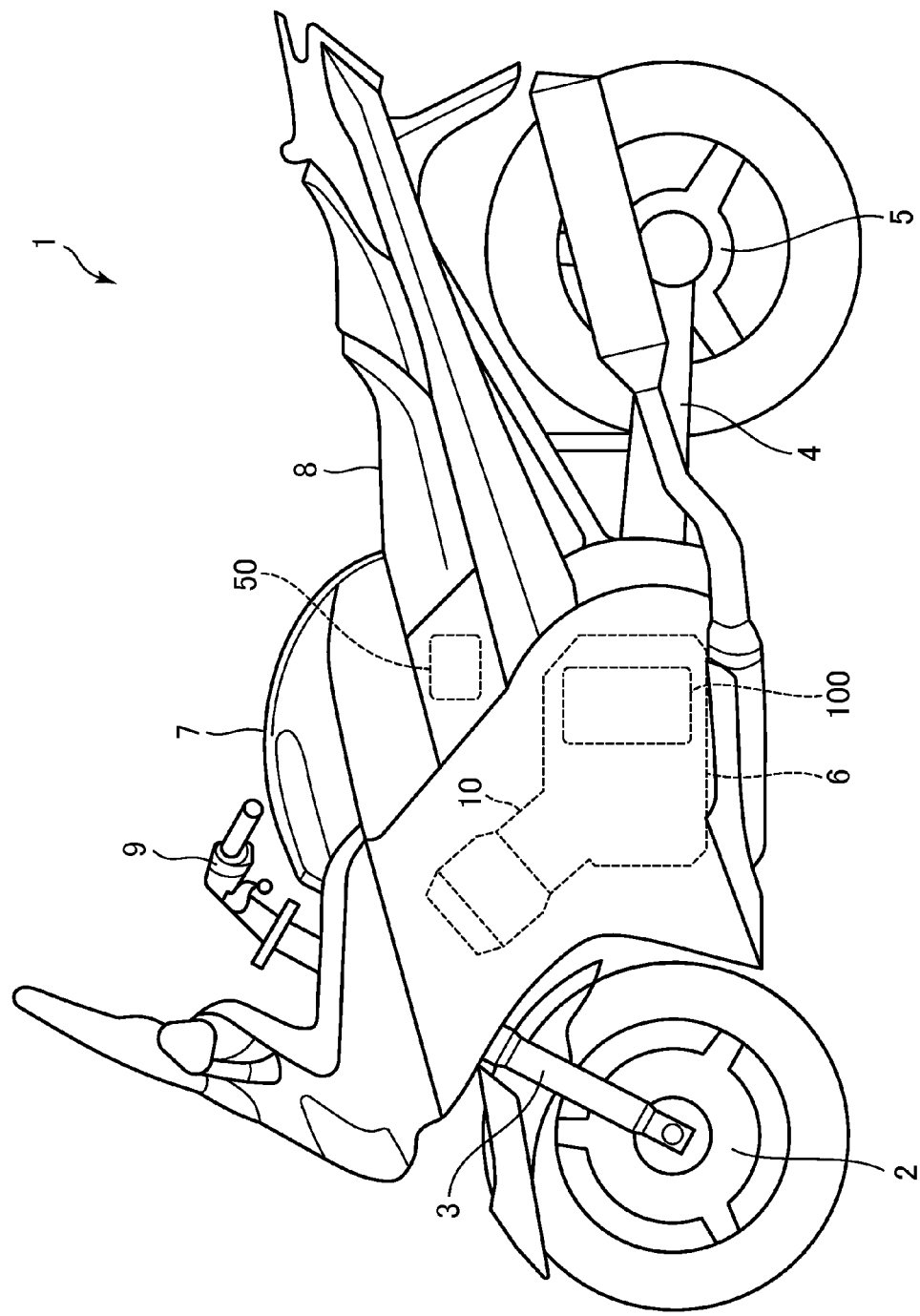
FIG. 1 is a side view of a motorcycle including a transmission apparatus according to a preferred embodiment.

As below, a preferred embodiment will be explained with reference to the drawings. A vehicle with a transmission apparatus of the embodiment may be any vehicle including an automobile and a straddle-type vehicle, and, here, a motorcycle will be explained. Further, in the embodiment, "front", "rear", "left", "right" refer to the front, rear, left, right as seen from a person who is seated on the seat of the motorcycle. FIG. 1 is a side view of a motorcycle 1 including a transmission apparatus 100 according to the preferred embodiment.

As shown in FIG. 1, the motorcycle 1 has a front wheel 2 supported on the lower end of a front fork 3 and a rear wheel 5 supported on the rear end of a rear arm 4. Further, the motorcycle 1 has an engine unit 6 between the front wheel 2 and the rear wheel 5. The engine unit 6 has an engine 10 and the transmission apparatus 100, and the transmission apparatus 100 has a transmission control unit (hereinafter, referred to as "control unit") 50, a clutch 14, and a transmission 20. The torque output by the engine 10 is transmitted to the rear wheel 5 via the transmission apparatus 100 (specifically, the clutch 14 and the transmission 20). The clutch 14 and the transmission 20 correspond to the transmission apparatus 100. In the example shown in FIG. 1, a fuel tank 7 is provided above the engine unit 6. A seat 8 is provided behind the fuel tank 7 and a steering handle 9 connected to the front fork 3 through a steering shaft is provided before the fuel tank 7. Note that the present disclosure may be applied to a scooter-type vehicle. In this case, the engine unit may be pivotably supported by the frame and the rear wheel may be supported by the engine unit.

Figure 2:
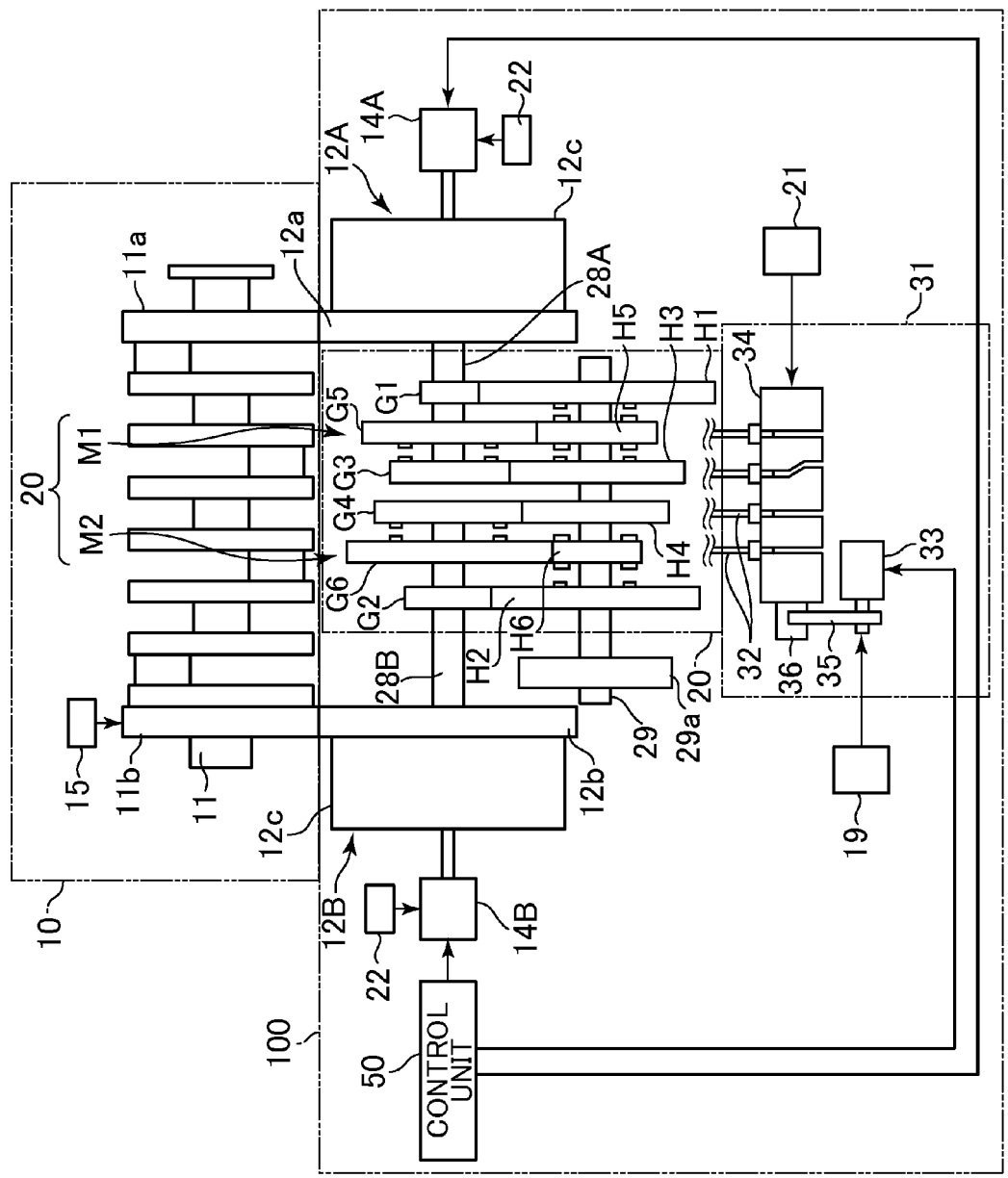
FIG. 2 is a schematic diagram showing an outline of a drive system of the motorcycle according to the preferred embodiment.

FIG. 2 shows an outline of the transmission apparatus 100 in the motorcycle 1. In FIG. 2, a crank shaft 11 of the engine 10, clutches 12A, 12B of the transmission apparatus 100, and the transmission 20 are shown. These are provided in the above described engine unit 6.

The transmission apparatus 100 of the example shown in FIG. 2 has two torque transmission paths from the engine 10 to an output shaft 29 of the transmission 20. The engine 10 has two primary drive gears 11a and 11b on the crank shaft 11. The two primary drive gears 11a and 11b are meshed with a primary driven gear 12a that drives the first clutch 12A and a primary driven gear 12b that drives the second clutch 12B, respectively. Each of the clutches 12A, 12B has a driving member (not shown) including a friction disc and a driven member (not shown) including a clutch disc inside of a clutch housing 12c thereof. The primary driven gears 12a and 12b, the clutch housings 12c, and the driving members integrally rotate. Further, each of the clutches 12A, 12B has a pressure plate (not shown) movable along the shaft, and the driving members and the driven members of the clutches 12A, 12B are pressed along the shaft by the pressure plates and engaged by mutual friction, and thereby, transmit torque. Furthermore, the motorcycle 1 has a first clutch actuator 14A and a second clutch actuator 14B that move the pressure plates along the shaft to engage or disengage the clutches 12A, 12B. The movement of the first clutch actuator 14A and the second clutch actuator 14B is controlled by the control unit 50 in the transmission apparatus 100. That is, the torque transmission capacity of the two clutches 12A, 12B is controlled by the control unit 50 in the motorcycle 1 on which the transmission apparatus shown in FIG. 2 is mounted.

The transmission 20 has two ratio-change mechanisms M1, M2 respectively forming the two torque transmission paths. The first ratio-change mechanism M1 has gears G1, G3, G5, H1, H3, H5 respectively corresponding to odd-numbered gear positions (first, third, fifth) and an input shaft 28A connected to the driven member of the first clutch 12A. The second ratio-change mechanism M2 has gears G2, G4, G6, H2, H4, H6 respectively corresponding to even-numbered gear positions (second, fourth, sixth) and an input shaft 28B connected to the driven member of the second clutch 12B. The ratio-change mechanisms M1, M2 have the common output shaft 29. The gears H1, H3, H5 are provided on the output shaft 29 and meshed with G1, G3, G5 provided on the input shaft 28A, respectively. Similarly, the gears H2, H4, H6 are provided on the output shaft 29 and meshed with G2, G4, G6 provided on the input shaft 28B, respectively. The gears G1 to G6 and H1 to H6 include gears movable along the shaft (hereinafter, referred to as "movable gears"). The movable gear is moved along the shaft by a shift mechanism 31 and engaged with another adjacent gear via a dog clutch. Thereby, arbitrary gear positions are realized. For example, the gear H5 moves along the shaft and is engaged with the adjacent gear H1, and thereby, the first gear position is formed. An output gear 29a connected to the rear wheel 5 via a chain and a shaft is provided on the output shaft 29.

The shift mechanism 31 has shift forks 32 for moving the movable gears along the shaft, a shift cam 34 for moving the shift forks 32 along the shaft, and a shift actuator 33 for rotating the shift cam 34 step-by-step. The shift actuator 33 is connected to a cam drive mechanism 36 provided on the end of the shift cam 34 via an arm 35. In the change gear operation (that is, ratio-change operation), the shift actuator 33 rotates to a predetermined angle to rotate the shift cam 34 via the arm 35 and the cam drive mechanism 36. Thereby, the shift forks 32 move along the shaft and move the movable gears. The directions of the rotations of the shift actuator 33 and the shift cam 34 are opposite to each other at shift-up and shift-down. After the movement of the movable gears is finished, when the shift actuator 33 is returned to the neutral position, the arm 35 and the cam drive mechanism 36 connected to the shift actuator 33 are returned to the neutral position. In this time, the shift cam 34, converges to, and is held at a predetermined phase by a cam phase holding means (not shown). The predetermined phase may mean the angle of the shift cam. The cam drive mechanism 36 does not transmit the movement of the shift actuator 33 to the shift cam 34 in the return operation. That is, the shift cam 34 is rotated to change the phase when the shift actuator 33 performs driving of shift-up and shift-down. And then the shift cam 34 is not rotated and is held in the predetermined phase when the shift actuator 33 reversely rotates and returns after the driving of shift-up and shift-down.

The transmission apparatus of the motorcycle 1 is not limited to that shown in FIG. 2. For example, the transmission apparatus may have only one torque transmission path. That is, the transmission apparatus may have only one clutch and only one input shaft connected thereto. Alternatively, the transmission 20 may be a belt-type continuously variable transmission.

As shown in FIG. 2, the transmission apparatus 100 mounted on the motorcycle 1 has the control unit 50. The control unit 50 of the example explained here controls the transmission 20 and the clutches 12A, 12B of the transmission apparatus 100. The control unit 50 has a microprocessor and a memory device including a ROM (Read Only Memory) and a RAM (Random Access Memory). Programs executed by the microprocessor, maps used in control, etc. are stored in the memory device.

Figure 3:
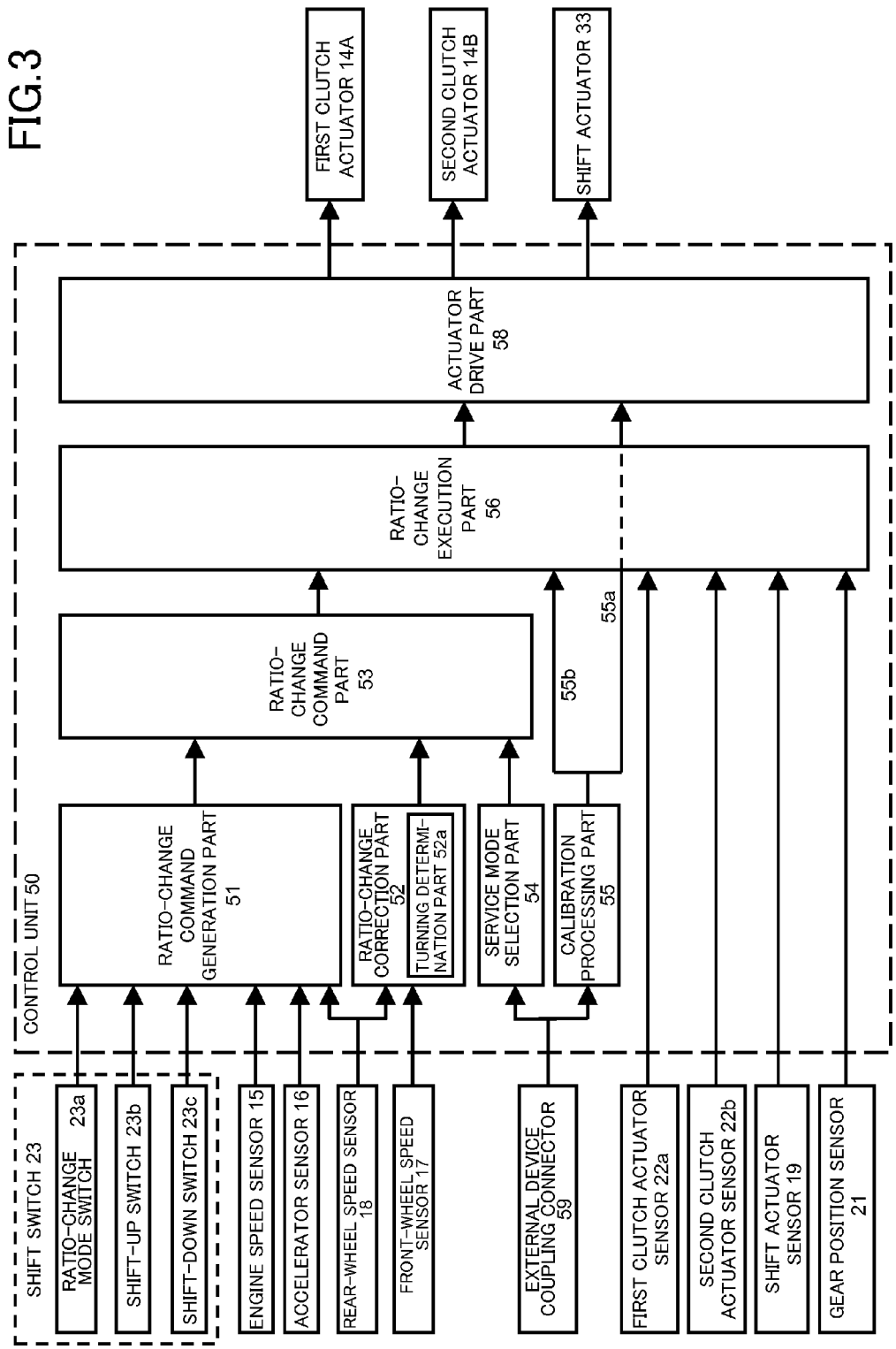
FIG. 3 is a block diagram showing a control unit of the transmission apparatus and sensors connected to the control unit according to the preferred embodiment.

FIG. 3 is a block diagram showing the control unit 50 and sensors and actuators connected to the control unit 50.

As shown in FIG. 3, the motorcycle 1 has an engine speed sensor 15, an accelerator sensor 16, a front-wheel speed sensor 17, a rear-wheel speed sensor 18, a shift actuator sensor 19, a gear position sensor 21, clutch position sensors 22a, 22b, and a shift switch 23.

The engine speed sensor 15 is for sensing the engine rotation speed (the rotation speed of the crank shaft 11). The accelerator sensor 16 is for sensing a manipulated amount of an accelerator grip provided on the steering handle 9 (a manipulated amount of accelerator). The front-wheel speed sensor 17 is for sensing the rotation speed of the front wheel 2, and the rear-wheel speed sensor 18 is for sensing the rotation speed of the rear wheel 5. The rear-wheel speed sensor 18 may not directly detect the rotation speed of the rear wheel 5. For example, the rear-wheel speed sensor 18 may output a signal in response to the rotation speed of the output shaft 29 of the transmission 20. In this case, the control unit 50 may calculate the rotation speed of the rear wheel 5 based on the output of the rear-wheel speed sensor 18 and the reduction ratio at the downstream of the output shaft 29. The shift actuator sensor 19 is for sensing an amount of movement of the shift actuator 33 (rotation angle of the actuator). The gear position sensor 21 is for sensing the gear position of the transmission 20 (specifically, the phase angle of the shift cam 34).

The shift switch 23 is for the driver to input a ratio-change request to the control unit 50 at normal driving, and includes a ratio-change mode switch 23a for changing the ratio-change mode during traveling, a shift-up switch 23b for inputting a shift-up request, and a shift-down switch 23c for inputting a shift-down request.

Note that the inputs of the sensors and the switches shown in FIG. 3 are part of inputs for the control unit 50. The inputs of the respective sensors and switches are connected with processing conveniently and representatively used in FIG. 3. However, they are actually connected to a data bus and available in various kinds of processing not shown in the drawing. Further, the control unit 50 is connected to an engine control unit (not shown) (hereinafter, referred to as "ECU") and an antilock brake control unit (hereinafter, referred to as "ABS") via data communication, and cooperatively operates with the engine and the brake.

In addition to the above described shift switch 23 operated by the driver at normal driving of the motorcycle 1, the control unit 50 includes an external device coupling connector (hereinafter, referred to as "connector") 59 for connection with an external device (a computer used by a worker who manufactures the motorcycle or a worker who does maintenance of the motorcycle). The external device may be completely separable from the motorcycle 1. That is, the external device may be inserted into the external device coupling connector 59, and then removed from the external device coupling connector 59 by a worker.

The control unit 50 may shift from a normal drive mode to a service mode. In the service mode, a part of the functions of the control unit 50 is limited under a condition that the above described external device is connected to the connector 59. Further, the control unit 50 may execute calibration processing of the sensor provided in the transmission 20 under the condition that the above described external device is connected to the connector 59 therefore causing the mode to be shifted to the service mode. The processing executed by the control unit 50 in the service mode will be described later in detail.

As shown in FIG. 3, functions of the control unit 50 has a ratio-change command generation part 51, a ratio-change correction part 52, a service mode selection part 54, a calibration processing part 55, a ratio-change command part 53, a ratio-change execution part 56, and an actuator drive part 58. The ratio-change correction part 52 includes a turning determination part 52*a*.

The control unit 50 has the normal drive mode and the service mode as the control modes thereof.

The normal drive mode is executed when the motorcycle 1 normally travels on a road in which various kinds of correction processing based on the front-wheel rotation speed are executed in the control of the transmission apparatus 100. Specifically, correction in a process of setting the transmission ratio (including "gear position" in its meaning) is executed by the ratio-change command part 53, using:

(i) a target of the transmission ratio generated by the ratio-change command generation part 51, and (ii) a correction value calculated by the ratio-change correction part 52 based on a difference or a ratio between the vehicle speed calculated from the front-wheel rotation speed and the vehicle speed calculated from the rear-wheel rotation speed.

After the correction value is calculated, the command of transmission ratio-change is given to the ratio-change execution part 56. Specifically, the correction value of the ratio-change command corresponds to the ratio-change time (including restriction of ratio-change) and/or the transmission ratio.

The service mode is a mode to be executed when the motorcycle 1 is driven for a trial run or the like on the chassis dynamo that may drive the rear wheel 5 while the front wheel 2 halts. The above described correction based on the front-wheel rotation speed in the control of the transmission apparatus 100 is not executed in the service mode. In the present embodiment, further, the processing by the calibration processing part 55 is executable under a condition that the service mode is selected.

As below, the respective functions of the control unit 50 will be explained in detail.

In the normal drive mode, the ratio-change command generation part 51 generates a target of the transmission ratio in normal traveling (that is, a target shift position or target transmission ratio to be selected) from the driving situation (specifically, the engine speed, the manipulated amount of the accelerator, the vehicle speed, or the like).

Further, an example of the ratio-change command generation part 51 has a semi-automatic mode and an automatic mode as the operation modes at normal driving, and the driver selects the mode using the ratio-change mode switch 23*a*. In the ratio-change mode switch 23*a* in the shift switch 23, the automatic mode or the semi-automatic mode is selected or a frequent ratio-change mode. An infrequent ratio-change mode, or the like in the automatic mode is selected according to the drivers preference and the traveling situation. In the automatic mode, both the transmission ratio-change operation (gear shift operation) and the clutch operation in the ratio-change during traveling are fully automatically performed and the driver can drive the motorcycle 1 only by operating the accelerator and the brake. In the semi-automatic mode, the transmission ratio is set by the driver, but the clutch operation is automated.

In the semi-automatic mode, the driver operates the shift-up switch 23*b* and the shift-down switch 23*c* in the shift switch 23, and thereby, the ratio-change request (gear-shift request) from the driver is input to the ratio-change command generation part 51. If the request is acceptable in light of the driving status of the vehicle, the ratio-change command generation part 51 gives a command of transmission ratio-change to the ratio-change command part 53, and, if the request is not acceptable, the part displays a warning message of no ratio-change to the driver and does not give a request of transmission ratio change to the ratio-change command part 53. Here, the unacceptable driving status refers to the state in which, when the transmission ratio is changed according to the request of the driver, the engine rotates at the over speed or at the lower speed to breakdown.

The ratio-change command generation part 51 generates, in the automatic mode, the target transmission ratio (target gear position) based on the driving status of the vehicle regardless of the operation by the driver. In this case, the ratio-change command generation part 51 may use a ratio-change map stored in the memory area of the control unit 50. The ratio-change map defines the transmission ratios (gear positions) set in the driving statuses (e.g., the manipulated amounts of accelerator and the vehicle speeds) in the transmission apparatus 100. The ratio-change command generation part 51 generates the target transmission ratio (gear position) to be applied to the current driving status based on the transmission ratio (gear position) defined by the ratio-change map. In this regard, the vehicle speed used by the ratio-change command generation part 51 is the rear-wheel vehicle speed calculated from the rear-wheel rotation speed, for example.

Figure 4:
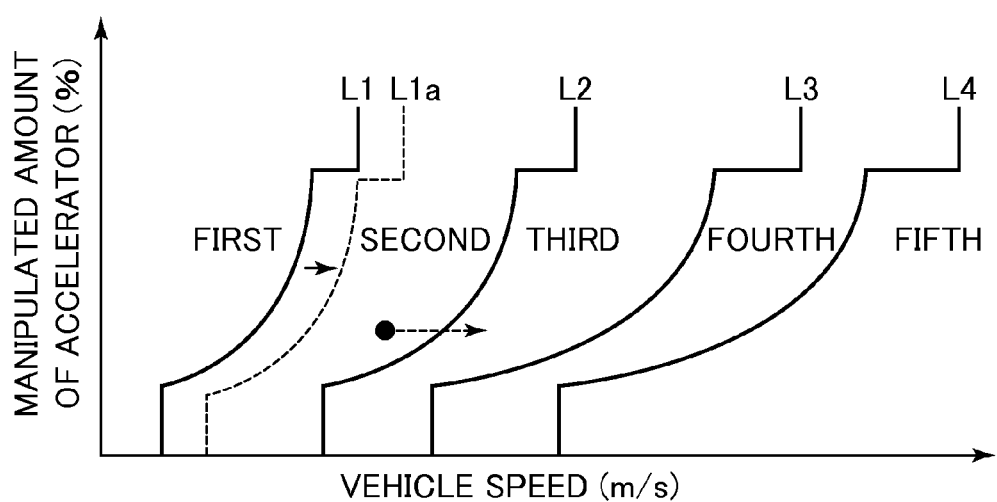
FIG. 4 shows an example of a map of transmission ratio (gear position).

FIG. 4 shows an example of a transmission ratio map stored in the memory area by the control unit 50. In the case where the map is used for the multi-stage transmission, in place of the transmission ratio map, a gear position map showing gear positions may be used. In FIG. 4, the horizontal axis indicates the vehicle speed and the vertical axis indicates the manipulated amount of accelerator. The transmission ratio (gear position) map shows areas of selective transmission ratios (gear positions). The ratio-change command generation part 51 constantly refers to the transmission ratio (gear position) map, generates the target of the transmission ratio (gear position), and sends it to the ratio-change command part 53. Then, when the driving status transitions across the boundary line (ratio-change line) of an area of a transmission ratio, the ratio-change command generation part 51 changes the target of the transmission ratio (gear position) to be commanded to the ratio-change command part 53 (e.g., from first to second, from second to third, or the like). That is, the ratio-change command generation part 51 gives a command of the transmission ratio (gear position) of the area to the ratio-change command part 53 as the target until the driving status crosses the line showing the area of the transmission ratio (ratio-change line) in FIG. 4, and gives a command of transmission ratio (gear position) of the new area as the target of the transmission ratio (gear position) to the ratio-change command part 53 when the status crosses the line showing the area of the transmission ratio (ratio-change line). Although the details will be described later, when the target of the transmission ratio (gear position) calculated by the ratio-change command generation part 51 is changed, the ratio-change command part 53 gives a command of ratio-change operation to the ratio-change execution part 56. With reference to FIG. 4, when the driving status transitions from the current point across the ratio-change line L2 to the right (when the status transitions from a black circle like a dashed arrow in the drawing), the ratio-change generation part 51 changes the transmission ratio (gear position) of the transmission 20 to be commanded to the ratio-change command part 53 from second position to third position. A ratio-change map for shift-up and a ratio-change map for shift down may be stored in the memory area of the control unit 50.

Further, in the case where the control unit 50 is used for a multi-level transmission, the ratio-change command generation part 51 may generate a command of ratio-change based on the engine rotation speed. For example, the ratio-change command generation part 51 may generate a command of ratio-change under a condition that the engine rotation speed is higher or lower than a predetermined threshold value. Specifically, the part may generate a shift-up command under the condition that the engine rotation speed is higher than the predetermined threshold value or generate a shift-down command under the condition that engine rotation speed is lower than the predetermined threshold value.

Furthermore, the ratio-change command generation part 51 may have only one of the semi-automatic mode and the automatic mode.

When the motorcycle turns at a relatively high speed, the vehicle body is tilted. That is, the motorcycle turns while banking at the relatively high speed. Accordingly, when turning, the contact point between the rear wheel and the road surface moves from the center in the width direction toward the side of the rear-wheel tire. As a result, the distance from the wheel axle of the rear wheel to the contact point between the road surface and the rear-wheel tire (hereinafter, referred to as "rear-wheel road-hugging radius") is smaller at turning than that at straight running. Similarly, when turning, the contact point between the front wheel and the road surface moves from the center toward the side of the front wheel along the width. Accordingly, the distance between the wheel axle of the front wheel to the contact point between the road surface and the front-wheel tire (hereinafter, referred to as "front-wheel road-hugging radius") is smaller at turning than that at straight running. In the motorcycle, generally, the thickness of the rear-wheel tire and the thickness of the front-wheel tire are different. Accordingly, the rate of reduction of the rear-wheel road-hugging radius due to turning and the rate of reduction of the front-wheel road-hugging radius due to turning are different. Specifically, the rear-wheel tire is generally thicker than the front-wheel tire, i.e., the radius of curvature of the section of the rear-wheel tire is larger than the radius of curvature of the section of the front-wheel tire, and thus, the reduced width of the rear-wheel road-hugging radius is larger than the reduced width of the front-wheel road-hugging radius. As a result, the vehicle speed calculated from the rear-wheel rotation speed (rear-wheel rotation speed x rear-wheel diameter x circumference ratio, hereinafter, referred to as "rear-wheel vehicle speed") is, in straight running, equal to the vehicle speed calculated from the front-wheel rotation speed (front-wheel rotation speed x front-wheel diameter x circumference ratio, hereinafter, referred to as "front-wheel vehicle speed"). But, in turning the rear-wheel vehicle speed is faster than the front-wheel vehicle speed. The turning determination part 52a determines whether or not the vehicle is turning using the phenomenon. For example, the turning determination part 52a determines that the vehicle is turning if the difference or the ratio between the front-wheel vehicle speed and the rear-wheel vehicle speed is larger than a threshold value.

The ratio-change correction part 52 gives a command of correction related to ratio-change control to the ratio-change command part 53 based on the front-wheel rotation speed. In the example explained here, the ratio-change correction part 52 corrects the ratio-change control so that execution of the ratio-change operation may be harder during turning of the vehicle. Specifically, the ratio-change correction part 52 performs correction as to the ratio-change time (including the restriction of ratio-change operation) based on the front-wheel rotation speed and the rear-wheel rotation speed. As will be described later, the correction is executed only when the normal drive mode is selected, but not executed when the service mode is selected.

During normal driving when the semi-automatic mode is selected, if the determination that the vehicle is turning is made based on the front-wheel rotation speed and the rear-wheel rotation speed by the ratio-change correction part 52, specifically, in the turning determination part 52a, the ratio-change correction part 52 restricts ratio-change, for example. That is, the ratio-change correction part 52 restricts transmission of the ratio-change command to the ratio-change execution part 56 by the ratio-change command part 53. The ratio-change correction part 52 may restrict the ratio-change command only in a predetermined time from a time when the determination that the vehicle is turning is made or may restrict the ratio-change command until the determination that the vehicle is turning is no longer made.

During normal driving when the automatic mode is selected, if the determination that the vehicle is turning is made based on the front-wheel rotation speed and the rear-wheel rotation speed by the ratio-change correction part 52, specifically, in the turning determination part 52a, the ratio-change correction part 52 performs processing of delaying the ratio-change time based on the front-wheel rotation speed and the rear-wheel rotation speed. For example, the ratio-change correction part 52 offsets the ratio-change line of the transmission ratio map (see FIG. 4) (gear position map) toward the higher speed or toward the lower speed by the amount in response to the difference or the ratio between the vehicle speed obtained from the front-wheel rotation speed (front-wheel vehicle speed) and the vehicle speed obtained from the rear-wheel rotation speed (rear-wheel vehicle speed) (this processing is referred as a correction of the transmission ratio map). The ratio-change line is shifted toward the higher speed in the transmission ratio map for shift-up (see L1a with respect to the ratio-change line L1 in FIG. 4). The ratio-change line is shifted toward the lower speed in the transmission ratio map for shift-down. The ratio-change command generation part 51 refers to the corrected transmission ratio map and generates a ratio-change command. Accordingly, the ratio-change time determined by the corrected transmission ratio map is delayed from the ratio-change time determined by the uncorrected transmission ratio map.

As described above, transmission control in the driving status in which the rear wheel rotates and the front wheel does not rotate is corrected from that in the normal driving status in which the rear wheel and the front wheel rotate at the substantially equal speeds. Specifically, restricting the change of the transmission ratio or delaying the ratio-change time is performed as the correction of transmission control.

The ratio-change command part 53 receives a correction command from the ECU or ABS connected via data communications to the control unit 50 in addition to the above described correction by the ratio-change correction part 52. Specifically, when the engine is cold-started and operated in the warming-up process, the ECU sends a signal indicating the current warming-up state to the control unit 50. Or, when the situation that the traveling road surface is slippery is estimated from the operational history of the ABS, the ABS sends a signal indicating the situation that the road surface is slippery to the control unit 50. In response thereto, the control unit 50, specifically, the ratio-change command part 53 corrects the target of the transmission ratio (gear position) generated in the ratio-change command generation part 51 and performs transmission control so that the lower engine speed than that for driving at the normal transmission ratio may be held.

Further, the ratio-change command part 53 does not give a command of new ratio-change to the ratio-change execution part 56 when the ratio-change operation according to the previous command is being executed in the ratio-change execution part 56. That is, the part restricts the ratio-change command during ratio-change.

The ratio-change command part 53 determines whether or not the ratio-change needs to be executed based on (i) the transmission ratio (gear position) commanded by the ratio-change command generation part 51 and (ii) the correction of the ratio-change commanded by the ratio-change correction part 52 or (iii) the ECU or ABS or the progress status of the ratio-change operation in the ratio-change execution part 56. When executing the ratio-change, the ratio-change command part 53 gives a command of ratio-change to the ratio-change execution part 56.

The ratio-change execution part 56 and the actuator drive part 58 operate the shift actuator 33 and the clutch actuators 14A, 14B in an order and an amount predetermined in response to the driving situation. The ratio-change execution part 56 gives a command of requested torque and a synchronization signal to the ECU and further controls the torque generated by the engine 10 and output from the crank shaft 11. The ratio-change execution part 56 executes the ratio-change operation in response to the ratio-change command. The ratio-change execution part 56 determines the operation times and the operation speeds so that the actuators 33, 14A, 14B and the engine 10 operate in the predetermined order and amounts. For example, when sensing the clutches 12A, 12B in non-engagement states based on the output of the clutch position sensors 22a and 22b, the ratio-change execution part 56 determines that the time to operate the shift actuator 33 and adjust the torque generated by the engine 10 has come. Further, when the movement of the movable gear is completed based on the output of the gear position sensor 21, the ratio-change execution part 56 determines that the time to operate the clutch actuators 14A, 14B has come. The actuator drive part 58 supplies the drive power to the shift actuator 33 and the clutch actuators 14A, 14B through the drive circuit (not shown) to drive the actuators at the time determined by the ratio-change execution part 56. Furthermore, the ECU adjusts the torque generated by the engine 10 to the requested torque previously commanded by the ratio-change execution part 56 at the time determined by the ratio-change execution part 56. The actuator drive part 58 of the example explained here drives the actuators 33, 14A, 14B also when a command is given from the calibration processing part 55, as will be described later.

As described above, the two torque transmission paths are provided in the drive system of the example explained here. Both of the two clutches 12A, 12B respectively provided in the two paths are in the engagement states in the initial state (during traveling before a ratio-change command is given). Further, in the initial state, one of the two ratio-change mechanisms M1, M2 is in the neutral state. The neutral state is defined as a state in which torque is not transmitted because none of the movable gears is not engaged with the adjacent gear. In the initial state, the other ratio-change mechanism forms one of the ratio positions (that is, gear position). That is, In the initial state, one movable gear meshes with the adjacent gear. In the following explanation, the path in which the torque is transmitted in the initial state is referred to as "previous path", and the path in which the torque is not transmitted in the initial state is referred to as "next path". The ratio-change execution part 56 performs operation of switching the path for transmitting torque from the previous path to the next path when receiving a ratio-change command.

The ratio-change execution part 56 and the actuator drive part 58 operate the shift actuator 33 and the clutch actuators 14A, 14B in the following order and amounts of control, for example, and the ratio-change execution part 56 coordinates the ECU to adjust the output torque of the engine 10.

(1) When the ratio-change execution part 56 starts ratio-change in response to the ratio-change command from the ratio-change command part 53, first, the clutch actuator (14A or 14B) is driven via the actuator drive part 58. And one clutch (one of 12A and 12B) in the previous path is set in the semi-engagement state. In the semi-engagement state, the torque capacity of the clutch is substantially the same as the torque currently output by the engine 10 and input from the crank shaft 11 to the other clutch via the primary drive gear 11a and the primary driven gear 12a or 11b and 12b. Further, the other clutch (the other of 12A and 12B) in the next path is set with the torque capacity of zero, i.e., in the non-engagement state.

(2) Then, the ratio-change execution part 56 drives the shift actuator 33 in the direction in response to the ratio-change command (shift-up direction or shift-down direction). Thereby, the movable gear corresponding to the ratio-change command moves along the shaft and is engaged with the adjacent gear. As a result, the ratio-change mechanism (M1 or M2) in the next path is set to the gear position corresponding to the ratio-change command. At this time, the ratio-change mechanism (M1 or M2) in the previous path remains engaged. Further, the ratio-change execution part 56 detects that the gear position of the ratio-change mechanism in the next path has established by the gear position sensor 21. After the detection, the ratio-change execution part 56 reversely drives and returns the shift actuator 33 via the actuator drive part 58 to the reference position. Concurrently, the shift cam 34 is separated from the reverse operation (rotation) of the shift actuator 33 by the cam drive mechanism 36 for transmitting the driving of the shift actuator 33 to the shift cam 34. At the same time, the phase (angle) of the shift cam 34 is held by phase holding means (not shown) for converging and holding the shift cam 34 to the phase corresponding to each gear position. As a result, the gear positions is established in both of the ratio-change mechanisms in the previous path and the next path.

(3) After having detected the engagement of the ratio-change mechanism in the next path, the ratio-change execution part 56 shifts the other clutch (12A or 12B) in the next path from the non-engagement state to the above described semi-engagement state. At the same time, the one clutch (12A or 12B) in the previous path is shifted from the above described semi-engagement state to the non-engagement state.

(4) After the torque capacity of the clutch (12A or 12B) in the next path has reached the above described semi-engagement state, the ratio-change execution part 56 starts adjustment of the torque generated by the engine 10 via the ECU. Thereby, the rotation speeds at the drive side of the clutch and the driven side of the clutch (12A or 12B) in the next path are closer, and then, synchronized (i.e., the clutch in the next path is engaged). After having detected that the rotation speeds at the drive side and the driven side of the clutch (12A or 12B) in the next path are synchronized, the ratio-change execution part 56 ends the adjustment of the torque generated by the engine 10 via the ECU. Further, the ratio-change execution part returns the clutch (12A or 12B) in the next path from the semi-engagement state to the engagement state.

(5) After the clutch (12A or 12B) in the next path is in the engagement state and the clutch (12A or 12B) in the previous path is in the non-engagement state, the ratio-change execution part 56 drives the shift actuator 33 in the direction corresponding to the ratio-change command (the same direction as that in (2)) again, and the ratio-change mechanism (M1 or M2) in the previous path is set in the neutral state. After the neutral state of the ratio-change mechanism (M1 or M2) in the previous path has been detected by the sensor value of the gear position sensor 21, the clutch (12A or 12B) in the previous path is returned from the non-engagement state to the engagement state. Further, the ratio-change execution part 56 reversely drives and returns the shift actuator 33 via the actuator drive part 58 to the reference position. Concurrently, the shift cam 34 is separated from the reverse operation (reverse rotation) of the shift actuator 33 by the cam drive mechanism 36, and then the phase of the shift cam 34 is held to the reference phase corresponding to each gear position by the above described phase holding means (not shown). As a result, the neutral state of the ratio-change mechanism in the previous path is maintained. Thereby, the ratio-change is completed.

The ratio-change operation is not limited to that explained as above. For example, in the motorcycle in which only one torque transmission path is provided, after the clutch shifts from the engagement state to the non-engagement state by the clutch actuator, the movable gear may be moved by the shift actuator and the gear for transmitting torque may be changed, and then, the clutch may return from the non-engagement state to the engagement state.

Next, the service mode will be explained. The service mode selection part 54 selects one of the above described normal drive mode and service mode. The service mode selection part 54 selects the service mode under a condition that an external device is connected to the connector 59. In an example, the service mode selection part 54 may select the service mode when the external device is connected to the connector 59 and the service mode selection part 54 receives a predetermined signal (hereinafter, referred to as "service mode selection command") from the external device. And, when the external device is not connected to the connector 59 or the external device is connected to the connector 59, but the service mode selection command is not received, the service mode selection part 54 may select the normal drive mode. Accordingly, the control device 50 may be prevented from shifting from the normal drive mode to the service mode without a drivers or worker's intention.

The correction (delaying of the ratio-change time and restriction of the ratio-change) in the transmission control by the ratio-change correction part 52 is limited in the service mode. Thereby, even when there is a difference between the front-wheel vehicle speed and the rear-wheel vehicle speed because the motorcycle 1 is driven on the chassis dynamo, the ratio-change operation is executed at the time when the shift switch 23 is operated and the time obtained from the ratio-change map. As a result, the trial run on the chassis dynamo may be smoothly performed.

In one example of the control unit 50, a flag indicating the currently selected mode (normal drive mode or service mode) may be stored in the memory device. The service mode selection part 54 may set the flag to a value indicating the service mode when the service mode is selected. In that case, the ratio-change correction part 52 constantly refers to the flag, and does not perform correction of ratio-change time (i.e., restriction of ratio-change and delaying of ratio-change time) when the flag indicates the service mode. Further, the ratio-change correction part 52 executes the correction of ratio-change time only when the flag indicates the normal drive mode.

When the service mode is selected, other processing using the front-wheel rotation speed may be limited. For example, the turning determination part 52a does not necessarily perform the above described turning determination using the front-wheel rotation speed when the service mode is selected.

The service mode selection part 54 determines whether or not the external device is connected to the connector 59. For example, the service mode selection part 54 may try to make communication with software for selection of the service mode activated in the external device connected to the connector 59, and then the service mode selection part 54 may determine the external device connected to the connector 59 when the communication is established with each other. The service mode selection part 54 may have an automatic detection function which automatically try to make communication with the software activated in the external device. The service mode selection part 54 may try to make communication with the software activated in the external device when a predetermined operation by a workers is carried out.

When receiving a predetermined signal (hereinafter, referred to as "calibration execution command") from software activated in the external device connected to the connector 59 in a situation in which the engine 10 is driven and the service mode is selected, the calibration processing part 55 executes predetermined calibration processing. Accordingly, the calibration processing starts only under the situation that the external device is connected to the connector 59. As a result, the calibration processing without the driver's or workers intention may be prevented from starting. While the calibration processing is executed, the above described ratio-change command generation part 51 does not operate (does not generate a command of transmission ratio). While the calibration processing is executed, a ratio-change command is generated in the calibration processing part 55, and the ratio-change command part 53 and the ratio-change execution part 56 operate.

The calibration processing part 55 of the example explained here executes the calibration processing with respect to the shift actuator sensor 19 and the gear position sensor 21. The calibration processing part 55 may send a result of the calibration processing to the external device through the connector 59. That is, the connector 59 used for sending the sensor value may be also used for detecting of the connection between the control unit and the external device. The result of the calibration processing includes, in its meaning, determining the sensor value of the sensor 19, 21, and a message indicating the normal end of the calibration processing, for example. The calibration processing part 55 acquires a sensor value of the shift actuator sensor 19 when the shift actuator 33 is rotated to a movable limit mechanically determined. Further, the calibration processing part 55 acquires sensor values of the gear position sensor 21 in the respective ratio position, that is gear positions.

Further, the calibration processing part 55 may determine whether or not the engine 10 is driven. The determination may be made based on the engine speed and on/off statuses of the engine start switch (not shown), for example. When receiving the calibration execution command under the situation that the engine 10 is not driven, the calibration processing part 55 may not start the calibration processing, but may display a message indicating the status on the external device, for example.

Before the start of the calibration processing of the example explained here, both of the ratio-change mechanisms M1, M2 in the two torque transmission paths are set in the neutral state by the worker. The calibration processing part 55 may determine whether or not both of the two ratio-change mechanisms M1, M2 are in the neutral state based on the sensor value of the gear position sensor 21. When both or either of the two ratio-change mechanisms M1, M2 is not in the neutral state, the calibration processing part 55 may not start the calibration processing, but may display a message indicating the status on the external device, for example.

The processing with respect to the shift actuator sensor 19 is executed in the following procedure, for example. As described above, both of the two clutches 12A, 12B are set in the engagement state except the time during ratio-change operation. Further, in an assumption, at the start of processing, both of the ratio-change mechanisms M1 and M2 are set in the neutral state, the rear wheel of the vehicle is supported on the chassis dynamo, and the engine is driven. Furthermore, in the assumption, the external device is connected to the connector 59 of the control unit 50, the software for selection of the service mode is activated in the external device, and the control unit 50 selects the service mode. In addition, in the assumption, the software for implementation of the calibration processing is activated in the external device, and waits for implementation.

When the calibration processing is implemented in the external device, the calibration processing part 55 first commands the actuator drive part 58 through a path 55a in FIG. 3 to drive the clutch actuators 14A, 14B, and moves the two clutches 12A, 12B from the engagement state to the non-engagement state. Then, the calibration processing part 55 commands the actuator drive part 58 to sequentially rotate the shift actuator 33 in the shift-up direction and the shift-down direction to the mechanically determined movable limit. Then, at the respective times of rotation to the movable limit in the shift-up direction and rotation to the movable limit in the shift-down direction, the calibration processing part 55 acquires the sensor values of the shift actuator sensor 19 and stores the sensor values in the memory device of the control unit 50. Further, the calibration processing part 55 calculates an intermediate value between the two sensor values and stores the intermediate value as a value indicating the neutral position of the shift actuator 33 in the memory device. Meanwhile, when the shift actuator 33 rotates in the shift-up direction, the ratio-change mechanism M1 is set to the gear position of the first gear position, and subsequently, when the shift actuator 33 rotates in the shift-down direction, the mechanism is set in the neutral state.

Next, the calibration processing part 55 executes calibration processing for the gear position sensor 21. Note that the calibration processing for the gear position sensor 21 may be executed after or before the calibration processing for the shift actuator sensor 19.

The calibration processing part 55 generates a ratio-change command instead of the ratio-change command part 53, gives the command to the ratio-change execution part 56 by a path 55b in FIG. 3, drives the clutch actuators 14A, 14B and the shift actuator 33 by the actuator drive part 58, and thereby, executes ratio-change operation. The calibration processing part 55 acquires the sensor values of the gear position sensor 21 that establish the respective gear positions. The transmission 20 of the example explained here has the ratio-change mechanisms M1, M2 as two power transmission paths, and performs ratio-change by the above described ratio-change operation. The calibration processing part 55 acquires the sensor value of the gear position sensor 21 (rotation angle of the shift cam 34) when one of the two ratio-change mechanisms M1, M2 is set to one gear position and the other ratio-change mechanism is in the neutral state. Subsequently, at the step of (2) in the above described ratio-change operation, the movable gear is engaged with the adjacent gear in both of the two ratio-change mechanisms M1, M2 (hereinafter, the state where the movable gear is engaged in the both of the mechanisms M1, M2 is referred to as "gear movement intermediate state"). The calibration processing part 55 also acquires the sensor value of the gear position sensor 21 in the gear movement intermediate state. In the following explanation, a state in which one ratio-change mechanism is set in the neutral state after the gear movement intermediate state and the other ratio-change mechanism is set to one gear position is referred to as "gear movement completion state".

When the calibration is executed, the calibration processing part 55 divides the ratio-change operations (1) to (5) into two stage, first stage of (1) and (2) and a second stage (3) to (5). That is, the calibration processing part 55 gives a command to the ratio-change execution part 56 and executes the above described ratio-change operations of (1) and (2), thereby, establishes the gear movement intermediate state, and acquires the sensor value of the gear position sensor 21 corresponding to the gear movement intermediate state. Subsequently, the calibration processing part 55 gives a command to the ratio-change execution part 56 and executes the above described ratio-change operations of (3) to (5), thereby, establishes the gear movement completion state, and acquires the sensor value of the gear position sensor 21 corresponding to the gear movement completion state.

Figure 5:
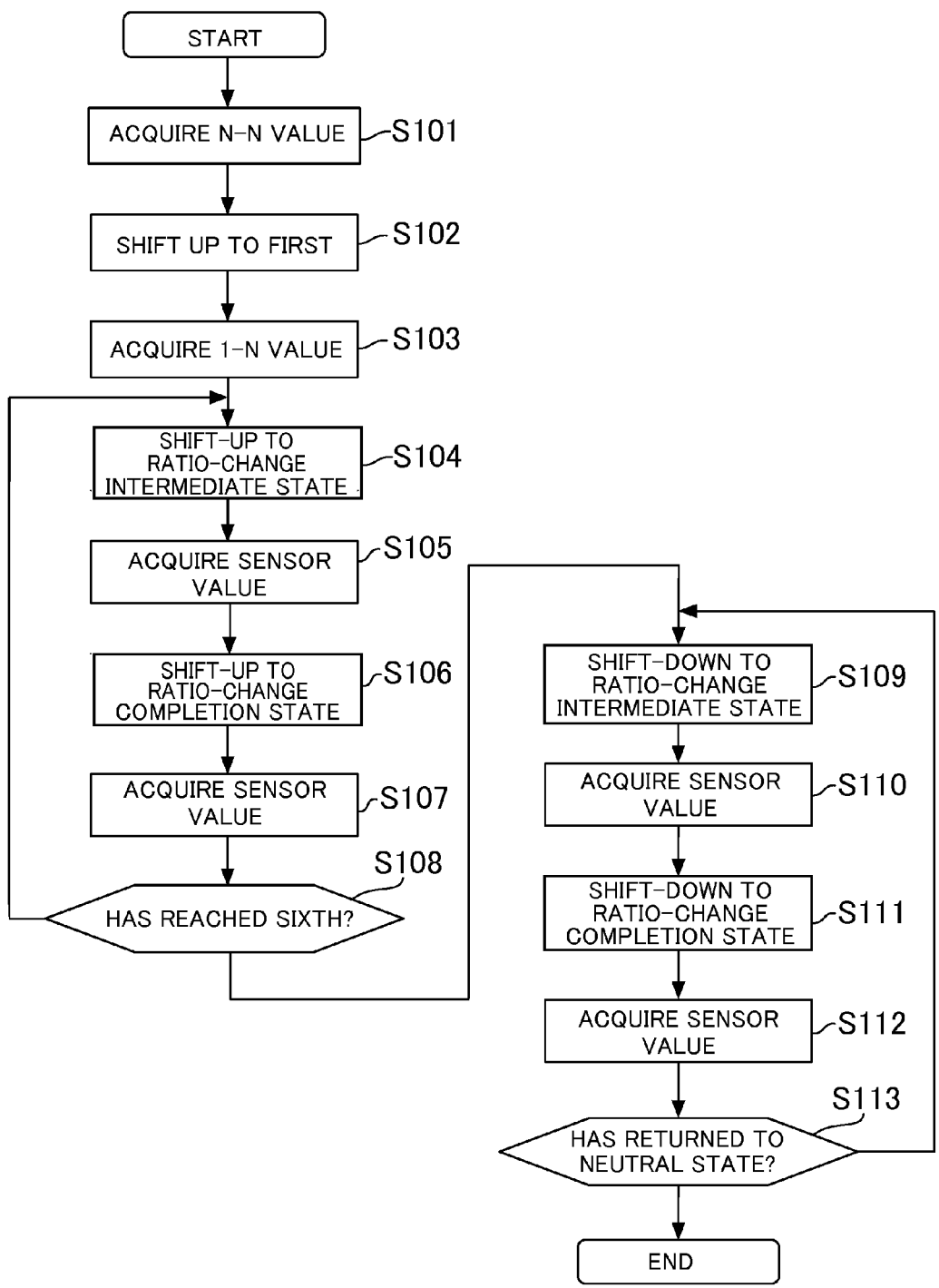
FIG. 5 is a flowchart showing an example of calibration processing for a gear position sensor.

FIG. 5 is a flowchart showing an example of the calibration processing with respect to the gear position sensor 21. As below, the calibration processing of the gear position sensor 21 will be explained with reference to FIG. 5.

As described above, before the start of the calibration processing of the example explained here, both of the two ratio-change mechanisms M1, M2 are set in the neutral state. The calibration processing part 55 first acquires the sensor value (N-N value) of the gear position sensor 21 in the state and stores the sensor value in the memory device of the control unit 50 (S101).

Then, the calibration processing part 55 gives a command of shift-up to the ratio-change execution part 56 by the path 55b, sequentially performs the above described ratio-change operations (1), (2), (3), (4), (5), and sets the transmission 20 to the first gear position (S102). Specifically, when the calibration processing part 55 gives the command of shift-up by the above described ratio-change operations (1), (2), (3), (4), (5) to the ratio-change execution part 56, the ratio-change execution part 56 sets the first clutch 12A connected to the first ratio-change mechanism M1 in the non-engagement state via the actuator drive part 58. Then, the ratio-change execution part 56 rotates the shift actuator 33 to a predetermined angle in the shift-up direction, and then, returns the shift actuator 33 to the neutral position. Thereby, the movable gear is engaged with the adjacent gear and the first ratio-change mechanism M1 is set to the first gear position. Then, the ratio-change execution part 56 returns the first clutch 12A to the engagement state. Here, the second ratio-change mechanism M2 remains set in the neutral state. When the ratio-change operation by the ratio-change execution part 56 is completed, the calibration processing part 55 acquires the sensor value (1-N value) of the gear position sensor 21 and stores the sensor value in the memory device of the control unit 50 (S103). Note that, at the ratio-change from the N-N state in which both of the ratio-change mechanisms M1, M2 are set in the neutral state to the 1-N state in which the first ratio-change mechanism M1 is set to the first gear position and the second ratio-change mechanism M2 is set in the neutral state, the operation for the second clutch 12B is skipped (may be performed) in the ratio-change execution part 56.

The calibration processing part 55 gives the command of shift-up to the ratio-change execution part 56 again, sequentially performs the above described ratio-change operations (1), (2), and temporarily sets the transmission 20 in the ratio-change intermediate state (S104). That is, in the process of shift-up operation from first to second, the ratio-change execution part 56 sets the first ratio-change mechanism M1 to the first position and the second ratio-change mechanism M2 to the second position (the state in which the gear position is 1-2). Specifically, the ratio-change execution part 56 sets the clutch 12B connected to the second ratio-change mechanism M2 in the non-engagement state according to the command from the calibration processing part 55. Then, the ratio-change execution part 56 rotates the shift actuator 33 to a predetermined angle in the shift-up direction, and then, returns the shift actuator 33 to the neutral position. At this time, the phase of the shift cam 34 is held by the phase holding means (not shown) in the state in which the gear position is set to the state of 1-2. Thereby, the movable gear moves along the shaft and is engaged with the adjacent gear. As a result, the second ratio-change mechanism M2 is set to the second position. Then, the calibration processing part 55 acquires the sensor value of the gear position sensor 21 and stores the sensor value in the memory device of the control unit 50 (S105). For example, in the process of shift up from first to second, the sensor value (1-2 value) in the state with the first ratio-change mechanism M1 in the first position and the second ratio-change mechanism M2 in the second position is acquired.

Then, the calibration processing part 55 gives the command of the above described ratio-change operations (3), (4), (5) to the ratio-change execution part 56 to progress the shift-up operation, and sets the transmission 20 in the ratio-change completion state (S106). For example, in the process of shift-up from first to second, the ratio-change execution part 56 returns the second clutch 12B to the engagement state and, at the same time, shifts the first clutch 12A to the non-engagement state according to the command from the calibration processing part 55. Then, the ratio-change execution part 56 rotates the shift actuator 33 to a predetermined angle in the shift-up direction, and then, returns the shift actuator 33 to the neutral position. In this time, the phase of the shift cam 34 is held by the phase holding means (not shown) in the state of N-2. Thereby, the movable gear of the first ratio-change mechanism M1 moves along the shaft and disengaged from the adjacent gear. As a result, the first ratio-change mechanism M1 is set in the neutral state and the transmission 20 is set in the ratio-change completion state. After the transmission 20 is set in the ratio-change completion state, the calibration processing part 55 acquires the sensor value of the gear position sensor 21 and stores the sensor value in the memory device of the control unit 50 (S107). For example, when shift-up from first to second is performed, the sensor value (N-2 value) in the state with the first ratio-change mechanism M1 in the neutral state and the second ratio-change mechanism M2 in the second position is acquired.

Then, the calibration processing part 55 determines whether or not the transmission 20 has reached the sixth position (S108). Here, if the transmission 20 has not reached the sixth position, the calibration processing part 55 gives the command of shift-up operation to the ratio-change execution part 56 again and repeats the processing at S104 to S107 until the transmission 20 reaches the sixth position.

After the transmission 20 has reached the sixth position, the calibration processing part 55 repeatedly gives a command of shift-down operation until the two ratio-change mechanisms M1, M2 reach the neutral state in the same procedure as that at shift-up, and acquires the sensor values of the gear position sensor 21 in the process. That is, the calibration processing part 55 performs shift-down, temporarily sets the transmission 20 in the ratio-change intermediate state (S109), acquires the sensor value of the gear position sensor 21, and stores the sensor value in the memory device of the control unit 50 (S110). Then, the calibration processing part 55 progresses the shift-down operation, sets the transmission 20 in the ratio-change completion state (S111), and acquires the sensor value of the gear position sensor 21 (S112).

The calibration processing part 55 determines whether or not both of the two ratio-change mechanisms M1, M2 of the transmission 20 have reached the neutral state (S113). Here, if the both of the ratio-change mechanisms M1, M2 have not reached the neutral state, the calibration processing part 55 gives the command of shift-down operation again and repeats the processing at S109 to S112. The calibration processing part 55 ends the processing if both of the two ratio-change mechanisms M1, M2 of the transmission 20 have reached the neutral state. As a result of the above processing, N-N value, 1-N value, 1-2 value, N-2 value, 3-2 value, 3-N value, 3-4 value, N-4 value, 5-4 value, 5-N value, 5-6 value, N-6 value are obtained in the memory device. The left numerals indicate the ratio positions set in the first ratio-change mechanism M1 and the right numerals indicate the ratio positions set in the second ratio-change mechanism M2, and the letters N indicate the neutral state. According to the processing of the calibration processing part 55, values obtained in the process of shift-up and the values obtained in the process of shift-down are stored in the memory device as the sensor values in the respective gear positions. The calibration processing part 55 may calculate average values of two values and store the values in the memory device.

After the processing with respect to the shift actuator sensor 19 and the processing with respect to the gear position sensor 21 are ended, the calibration processing part 55 transmits the sensor values stored in the memory device to the external device automatically or according to the command received from the external device. In the external device, the sensor values may be displayed.

As described above, while the processing by the calibration processing part 55 is executed, the engine 10 is driven and the rear wheel (drive wheel) 5 is rotatable on the chassis dynamo. Accordingly, in the shift-up operation and the shift-down operation by the calibration processing part 55, the movable gear and the adjacent gear relatively rotate. Therefore, the dog clutches of the two gears to be moved closer along the shaft in the ratio-change operation are smoothly engaged.

In one example, while the processing by the calibration processing part 55 is executed, the engine 10 is driven while idling. Further, the calibration processing part 55 may control the engine 10 via the ECU so that the engine speed may take a predetermined value or more. For example, the engine 10 is provided with a throttle valve for adjustment of the amount of air supplied to the engine 10. A throttle actuator is provided for control of the opening of the throttle valve. In this case, the calibration processing part 55 may control the engine 10 by driving the throttle actuator via the ECU so that the engine speed may take a predetermined value or more. The movable gear and the adjacent gear thereto may be engaged more smoothly.

Figure 6:
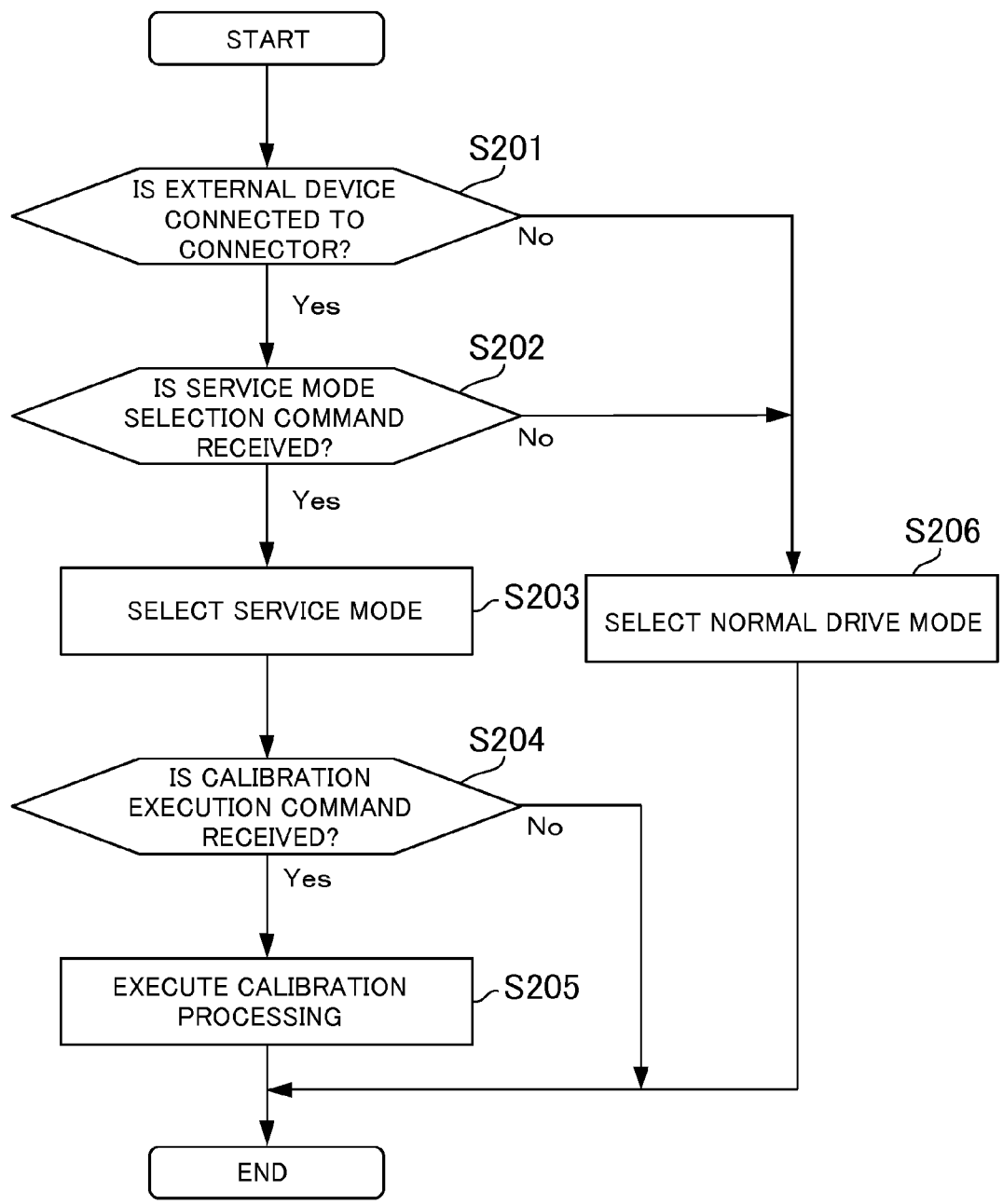
FIG. 6 is a flowchart showing an example of processing executed by the control unit.

FIG. 6 is a flowchart showing an example of processing executed by the control unit 50. The processing executed by the control unit 50 is not limited thereto.

The service mode selection part 54 determines whether or not the external device is connected to the connector 59 (S201). If the external device is connected, the service mode selection part 54 determines whether or not the service mode selection command is received from the external device (S202). If the service mode selection command is received, the service mode selection part 54 selects the service mode (S203), and sets the flag provided in the memory device of the control unit 50 to the value indicating the service mode, for example, as described above. On the other hand, if the external device is not connected to the connector 59 or if the service mode selection command is not received, the service mode selection part 54 selects the normal drive mode (S206).

If the service mode is selected, the calibration processing part 55 determines whether or not the calibration execution command has been received from the external device (S204). At S204, the calibration processing part 55 may further determine whether or not the engine is driven. If the calibration execution command has been received, the calibration processing part 55 executes the above described calibration processing. On the other hand, if the calibration execution command has not been received, the control unit 50 ends the current processing. The control unit 50 repeatedly executes the processing while the main switch (not shown) of the vehicle is on, for example.

According to a configuration where the processing in FIG. 6 is executed only while the main switch of the vehicle is on, selection of the service mode may be automatically ended and the selection may be changed to the normal drive mode when the connection of the external device and the connector 59 is cut. With the above configuration, even when the worker forgets to end the service mode selection (improper operation), the normal drive mode is selected in the normal drive which does not have the connection of the external device to the connector 59. The service mode selection part 54 may detect automatically that the connection between the external device and the connector is cut. According to the processing, even when the worker forgets to end the service mode selection, the normal drive mode is selected in the normal drive.

As has been explained above, the motorcycle 1 includes the engine 10 and the transmission 20, and has the engine unit 6 that outputs drive power of the rear wheel 5, and the front-wheel speed sensor 17 for sensing the rotation speed of the front wheel 2. Further, the control unit 50 has the ratio-change correction part 52 that executes correction in the control of the transmission apparatus 100 using the rotation speed of the front wheel 2 sensed by the front-wheel speed sensor 17. The motorcycle 1 has the external device coupling connector 59 to which the external device is connectable. The control unit 50 limits the correction of transmission control executed by the ratio-change correction part 52 under the condition that the external device is connected to the connector 59. According to some aspects of the present disclosure, when the motorcycle 1 is placed and driven on the chassis dynamo, the external device is connected to the connector 59, and thereby, correction on the transmission control without the worker's intention may be suppressed.

The present disclosure is not limited to the above described motorcycle 1, but various changes may be made.

For example, the present disclosure may be applied to a vehicle having a continuously variable transmission. This type of vehicle has a sheave actuator that moves a sheave of the continuously variable transmission and a sheave position sensor for detecting the sheave position in place of the shift actuator 33 and the shift actuator sensor 19. In this case, the control unit 50 performs the following processing, for example.

In the memory device of the control unit 50, a map that associates the vehicle speed with the operation amount of accelerator and the target engine rotation speed is stored in place of the above described transmission ratio map. Further, the control unit 50 calculates the target transmission ratio based on the vehicle speed and the target engine rotation speed so that the actual engine rotation speed may be the target engine rotation speed. Then, the control unit 50 moves the sheave of the continuously variable transmission by the actuator so that the actual transmission ratio becomes equal to the target transmission ratio. In such a vehicle, the ratio-change correction part 52 may perform correction in the ratio-change control based on the front-wheel rotation speed. For example, like the motorcycle 1, if the ratio-change correction part 52 determines that the vehicle is turning based on the front-wheel rotation speed and the rear-wheel rotation speed, the part restricts ratio-change operation. That is, even when there is a difference between the actual transmission ratio and the target transmission ratio, the transmission ratio of the continuously variable transmission is not changed. Furthermore, if the ratio-change correction part 52 determines that the vehicle is turning based on the front-wheel rotation speed and the rear-wheel rotation speed, the part may correct the target transmission ratio so that the difference between the actual transmission ratio and the target transmission ratio may be smaller than a predetermined value. According to the above processing, when the vehicle is turning, significant change of the transmission ratio in a short time may be suppressed.

The processing of the service mode selection part 54 of the vehicle having the continuously variable transmission is the same as that of the motorcycle 1. That is, the service mode selection part 54 selects the service mode when the external device is connected to the connector 59 and the command of service mode selection is received from the external device.

Figure 7:
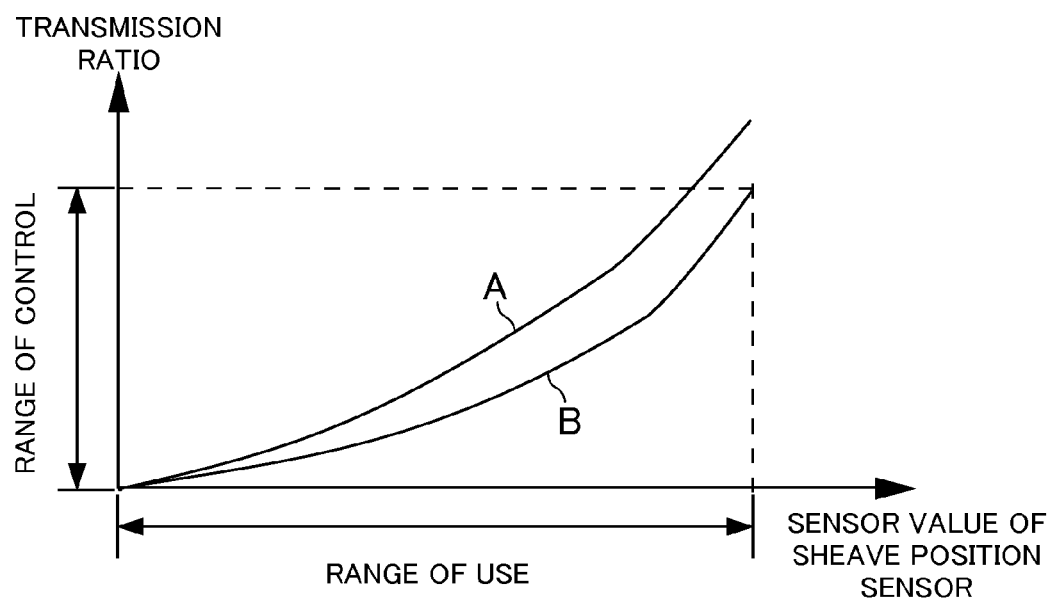
FIG. 7 shows relationships between sensor values of a sheave position sensor and transmission ratios in a vehicle including a continuously variable transmission.

The calibration processing part 55 executes processing of calculating the actual transmission ratio based on the engine rotation speed and the rear-wheel rotation speed and acquiring sensor values of the sheave position sensor while driving the engine. The calibration processing part 55 changes the sheave position and thereby executes the above processing of calculating the actual transmission ratio at a plurality of sheave positions. FIG. 7 shows relationships between the sensor value of the sheave position sensor and the transmission ratio. The horizontal axis indicates the sensor value of the sheave position sensor and the vertical axis indicates the transmission ratio. Line A shows the relationship between the sensor value obtained by the above calibration processing and the transmission ratio obtained by the above calculation. It is desirable that the range of use of the sensor value of the sheave position sensor corresponds to the range of control of the transmission ratio as shown by line B. However, in the line A, the range of use of the sensor value does not correspond to the range of control of the transmission ratio. When the acquisition of the sensor values of the sheave position sensor and the calculation of the actual transmission ratio is executed at the plurality of sheave positions as described above, a map which indicates a relationship between the sensor value of the sheave position sensor and the transmission ratio can be made such that the range of use of the sensor value in the map corresponds to the range of control of the transmission ratio in the map as shown by line B. While aspects have been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A transmission apparatus, comprising:
    an actuator that changes a transmission ratio of a transmission;
    a front-wheel speed sensor that detects and outputs a rotation speed of a front wheel;
    a transmission ratio sensor that detects and outputs a value of the transmission ratio; and
    a control unit that receives the value of the transmission ratio from the transmission ratio sensor and receives the rotation speed from the front-wheel speed sensor, the control unit setting and controlling the transmission ratio by driving the actuator, the control unit including
        a ratio-change correction part that determines a correction in the controlling of the transmission ratio by the control unit based upon the rotation speed, and
        a connector for connecting to an external device to enable communication between the control unit and the external device,
    the control unit limiting an execution of the correction under a condition that the external device being connected to the connector.

2. The transmission apparatus according to claim 1, wherein the control unit limits the execution of the correction under a condition that the control unit receives a predetermined signal from the external device.

3. The transmission apparatus according to claim 1, wherein under the condition that the external device is connected to the connector, the control unit limits the execution of the correction, and simultaneously executes calibration processing by acquiring a sensor value output by the transmission ratio sensor.

4. The transmission apparatus according to claim 3, wherein the control unit sends a result of the calibration processing to the external device through the connector.

5. The transmission apparatus according to claim 1, wherein based on the rotation speed of the front wheel and a rotation speed of a rear wheel, the ratio-change correction part corrects at least one selected from the group consisting of the transmission ratio and a transmission ratio-change time of the transmission.

6. A vehicle on which the transmission apparatus according to claim 1 is mounted.

7. A motorcycle on which the transmission apparatus according to claim 1 is mounted.

8. The transmission apparatus according to claim 1, wherein in every instance that the external device is connected to the connector, the control unit limits any execution of any correction determined by the ratio-change correction part.

9. The transmission apparatus according to claim 1, wherein the correction includes delaying a ratio-change that is determined to be executed by the control unit.

10. The transmission apparatus according to claim 1, wherein the correction includes restricting a ratio-change of the transmission ratio.

11. The transmission apparatus according to claim 1, wherein the transmission apparatus is attached to a vehicle, and the correction is executed in each instance that both
    the connector is not connected to the external device, and
    the vehicle is determined to be turning.

12. The transmission apparatus according to claim 1, wherein in every instance that the external device is connected to the connector, the control unit stops any execution of any correction determined by the ratio-change correction part.

13. The transmission apparatus according to claim 1, wherein the control unit limits the execution of the correction only under the condition that the external device is connected to the connector.

14. A vehicle comprising:
    a front wheel;
    a transmission;
    an actuator that changes a transmission ratio of the transmission;
    a front-wheel speed sensor that detects and outputs a rotation speed of the front wheel;
    a transmission ratio sensor that detects and outputs a value of the transmission ratio; and
    a control unit that receives the value of the transmission ratio from the transmission ratio sensor and receives the rotation speed from the front-wheel speed sensor, the control unit setting and controlling the transmission ratio by controlling the actuator, the control unit being switchable between a service mode and a normal drive mode, the control unit including
        a ratio-change correction part that determines a correction in the controlling of the transmission ratio by the control unit based upon the rotation speed of the front wheel, and
        a connector for connecting to an external device to enable communication between the control unit and the external device,
    the control unit switching from the normal drive mode to the service mode in each instance that the external device is connected to the connector, and in the service mode, the control unit limits execution of the correction.

15. The vehicle according to claim 14, wherein in response to the external device being connected to the connector, the control unit limits the execution of the correction, and simultaneously executes calibration processing by acquiring a sensor value output by the transmission ratio sensor.

16. The vehicle according to claim 15, wherein the control unit sends a result of the calibration processing to the external device through the connector.

17. The vehicle according to claim 14, further comprising a rear wheel, wherein based on the rotation speed of the front wheel and a rotation speed of the rear wheel, the ratio-change correction part corrects at least one selected from the group consisting of the transmission ratio and a transmission ratio-change time of the transmission.

18. The vehicle according to claim 14, wherein in every instance that the external device is connected to the connector, the control unit limits any execution of any correction determined by the ratio-change correction part.

19. The vehicle according to claim 14, wherein the correction includes delaying a ratio-change that is determined to be executed by the control unit.

20. The vehicle according to claim 14, wherein the correction includes restricting a ratio-change of the transmission ratio.

21. The vehicle according to claim 14, wherein the correction is executed in each instance that both the connector is not connected to the external device, and the vehicle is determined to be turning.

22. The vehicle according to claim 14, wherein the control unit switches from the normal drive mode to the service mode only if the external device is connected to the connector.

* * * * *